(No Model.) 2 Sheets—Sheet 1.
C. W. ROGERS.
MACHINE FOR MAKING LEATHER CRUPPERS.
No. 360,730. Patented Apr. 5, 1887.
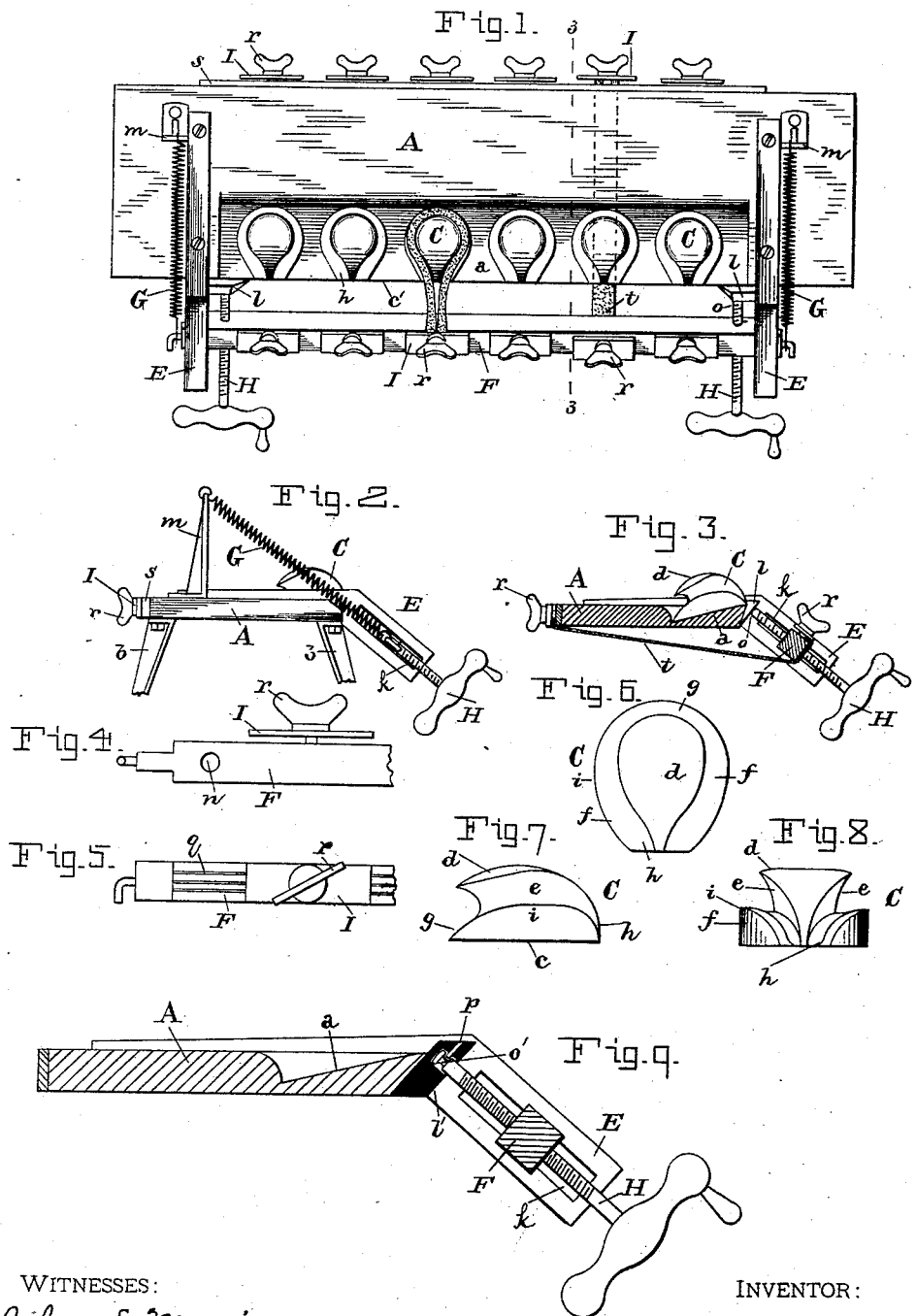

(No Model.) 2 Sheets—Sheet 2.
C. W. ROGERS.
MACHINE FOR MAKING LEATHER CRUPPERS.
No. 360,730. Patented Apr. 5, 1887.
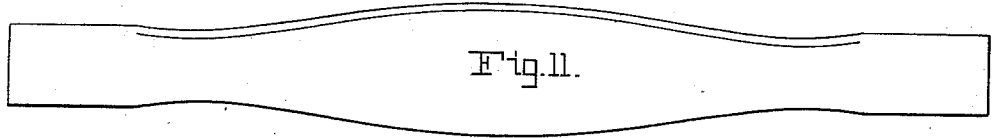
Fig. 10.
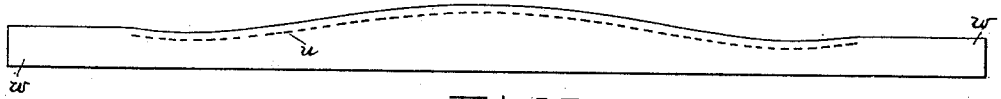
Fig. 11.
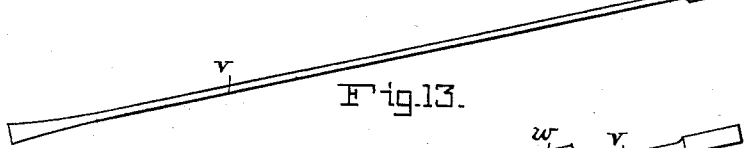
Fig. 12.
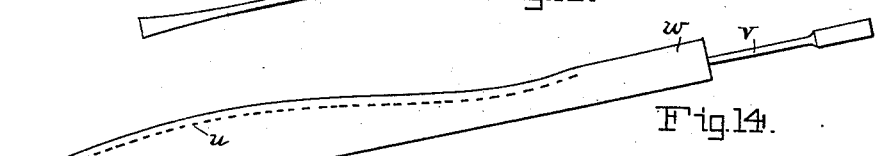
Fig. 13.
Fig. 14.
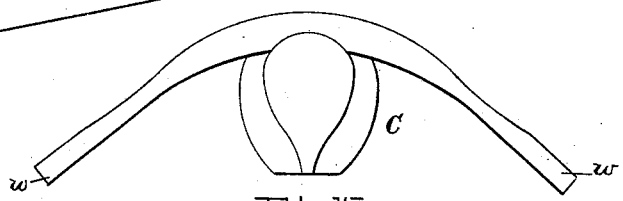
Fig. 15.
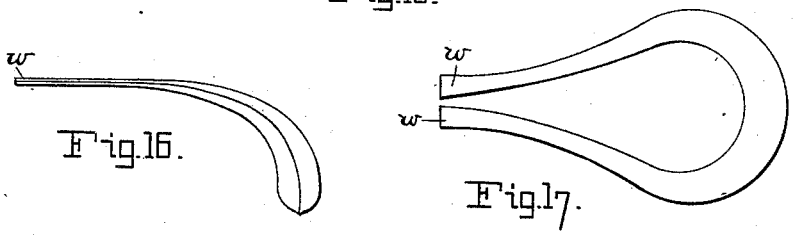
Fig. 16.
Fig. 17.
WITNESSES:
John E. Morris.
A. E. Eader
INVENTOR:
C. W. Rogers
BY Chas B. Mann
ATTORNEY.

UNITED STATES PATENT OFFICE.

CHARLES W. ROGERS, OF BALTIMORE, MARYLAND.

MACHINE FOR MAKING LEATHER CRUPPERS.

SPECIFICATION forming part of Letters Patent No. 360,730, dated April 5, 1887.

Application filed November 23, 1886. Serial No. 219,668. (No model.)

*To all whom it may concern:*

Be it known that I, CHARLES W. ROGERS, a citizen of the United States, residing at Baltimore, in the State of Maryland, have invented certain new and useful Improvements in Processes of and Machines for Making Leather Cruppers for Harness, of which the following is a specification.

My invention relates to an improvement in processes of and machines for making leather cruppers for harness.

The invention is illustrated in the accompanying drawings, in which—

Figure 1 is a top view of the machine. Fig. 2 is a cross-section of the machine on the line 3 3. Figs. 4 and 5 are views of part of the stretching-bar. Figs. 6, 7, and 8 are views of the shaping-block, showing side, top, and front views, respectively. Fig. 9 is a cross-section of the machine, showing a modification. Fig. 10 shows a strip of leather from which the crupper is to be formed and which is ready to be stretched. Fig. 11 shows the same stretched and cut to proper shape. Fig. 12 shows the same folded longitudinally along the center and stitched, thereby forming a tube. Fig. 13 shows the filling-rammer. Fig. 14 shows the tube and rammer. Fig. 15 shows the filled tube placed in position about the shaping-block. Figs. 16 and 17 are views of the finished crupper.

The letter A designates the stand-top, supported on legs $b$. That part $a$ which supports the shaping-blocks has a backwardly-inclined position, as shown in Figs. 3 and 9. The entire stand-top may incline backward, or, as shown, only the front portion of the said top may be inclined.

The shaping-blocks C are employed to give the finished form to the filled leather tubes, which are filled while straight. The shaping-blocks (see Figs. 6, 7, and 8) have a base with a flat bottom, $c$, and surmounting the base is a central dome part, $d$, the plan of which is approximately pear-shaped with a concave side wall, $e$, and, circling around the said dome, the top of the base forms a lateral flange, $f$, whose top surface is low at both the rear side, $g$, and front side, $h$, and curved up or raised, as at $i$, between said rear and front side. This form of block, it will be seen, will impart to the crupper the finished shape, which comprises two shapes—first, the horseshoe or U shape, and, second, the down curve to the thick part of the crupper.

The shaping-blocks C set on and are secured to the backwardly-inclined part $a$ of the stand-top with the front side, $h$, of each block at the front edge, $c'$, of the stand-top.

The stand-top has at its front edge two downwardly-inclined arms, E—one arm at each of the two ends. Each arm has a longitudinal slot, $k$, and a lug, $l$, projects from one side near the front edge of the stand-top. A stretching-bar, F, extends horizontally from one arm E to the other, and the ends of this bar loosely occupy the slots $k$ in the arms, whereby the bar may move up and down in an inclined direction. Each end of the stretching-bar has one end of a spiral spring, G, attached to it, and the other ends of the springs are made fast to posts $m$, secured on the stand-top A. These springs keep the stretching-bar F drawn normally up the inclined arms toward the stand-top. The stretching-bar has near each end a screw-hole, $n$, and a screw, H, fits in each hole. One end, $o$, of the screw bears against the side lug, $l$, near the front edge of the stand-top, and by turning the said screws in one direction the stretching-bar F will be drawn down the inclined arms and away from the stand-top.

The springs G are useful, because they facilitate the operation of moving the stretching-bar F; but said springs are not essential to the said operation. Fig. 9 shows a modification of the stand-top, stretching-bar, and screws whereby the said springs may be dispensed with. In this modification the side lug, $l'$, has a socket for the end of the screw to enter and the end of the screw has a ring-groove, $o'$. A pin, $p$, projects into the socket far enough for its end to occupy the said ring-groove. Thus the screw may be turned, but cannot advance or retreat. It follows that the bar F, through which the screw passes, will be forced to move either up or down the incline, according to the direction the screws may be turned.

The bar F is provided on one surface with serrations or grooves $q$ and screw-clamps. These clamps comprise short plates I and a thumb-screw, $r$, through each plate into the bar F. The rear edge of the stand-top is provided with a bar or plate, s, which may be serrated like the stretching-bar, and which has screw-clamps I r of the same construction as those on the said bar.

In making cruppers a strip of leather, t, of proper size, (represented in Fig. 10,) is first stretched lengthwise by fastening one end in the screw-clamp on the rear edge of the stand-top and the other end in the screw-clamp on the stretching-bar. A strip thus clamped is shown in Figs. 1 and 3. As many strips may be thus clamped at one time as there are screw-clamps on the stand and bar. In the present instance the number is six, though more or less may be used. By turning the screws H, the bar F will draw the leather strips endwise and hold them as long as may be desired. When thus stretched, the strip is cut to proper shape, as shown in Fig. 11. The strip is then folded longitudinally along the center and the two edges united by a row of stitches, u, and thereby forms a tube. This leather tube is then filled with suitable stuffing material, preferably flaxseed, which is rammed, while the filling is being done, with a rod, v. (See Figs. 13 and 14.) When the tube is full, the shape of a crupper is imparted to it by placing it about one of the shaping-blocks C, as many of which are used as there are clamps, and fastening the ends w of the leather tube in a screw-clamp on the stretching-bar F, and, finally, by turning the screws H, the filled tube is drawn hard and stretched about the shaping-block C, which gives the desired finished shape—to wit, the horseshoe or U shape and the down-curved shape.

It will be seen the leather of the crupper is subjected to two different kinds of stretchings—one in which the stretch is all lengthwise and the other, after the tube is filled, in which the filled part is stretched on a curve. The result is, the cruppers will have a uniform shape, they will maintain their shape, and their production will be greatly cheapened.

Having described my invention, I claim—

1. The block C, for shaping cruppers, consisting of a dome part, d, the plan of which is approximately pear-shaped, with a concave side wall, e, said dome part surmounting the center of a base, the top of which forms a lateral flange, f, circling around the said dome, and the top surface of said flange being low at both the rear side, g, and the front side, h, and curved up between said rear and front, whereby a crupper will have imparted to it the finished shape, consisting of the horseshoe or U shape, and also the down curve to the thick part, as set forth.

2. The combination of a stand-top, a block, C, for shaping cruppers, secured on said stand-top, and a stretcher for gripping the ends of the crupper, secured to the stand at an inclination, whereby the filled leather tube to form the crupper may be drawn and stretched about the shaping-block, as set forth.

3. In a machine for the manufacture of cruppers, the combination of a stand having clamps, a stretching-bar, F, having clamps, and screws H, to turn in screw-holes on the bar, and having one end against a fixed bearing at the front of the stand, for the purpose set forth.

4. In a machine for the manufacture of cruppers, the combination of a stand having clamps, a stretching-bar, F, having clamps, screws H, to turn in screw-holes on the bar and having one end against a fixed bearing at the front of the stand, and spiral springs connecting the stretching-bar with the stand, for the purpose set forth.

5. In a machine for the manufacture of cruppers, the combination of a stand having clamps, a block, C, for shaping cruppers, secured on said stand-top, two arms, E, secured to the stand and inclining therefrom, a stretching-bar having clamps on it and having its ends movable on the said inclined arms, and screws H, to move the stretching-bar, for the purpose set forth.

In testimony whereof I affix my signature in the presence of two witnesses.

CHARLES W. ROGERS.

Witnesses:
JOHN E. MORRIS,
JNO. T. MADDOX.